(12) United States Patent
Kurihara et al.

(10) Patent No.: US 6,501,529 B1
(45) Date of Patent: Dec. 31, 2002

(54) LIQUID CRYSTAL DISPLAY ELEMENT INTEGRATED WITH A TOUCH SENSOR

(75) Inventors: Mikio Kurihara, Yamato (JP); Eisuke Kanzaki, Fujisawa (JP); Fumitoshi Kiyooka, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 09/627,517

(22) Filed: Jul. 28, 2000

(30) Foreign Application Priority Data

Aug. 18, 1999 (JP) .......................................... 11-231022

(51) Int. Cl.[7] ........................................... G02F 1/1333
(52) U.S. Cl. ..................... 349/160; 349/12; 345/173; 345/174
(58) Field of Search ..................... 349/12, 23; 345/173, 345/174

(56) References Cited

U.S. PATENT DOCUMENTS 5,677,744 A * 10/1997 Yoneda et al. ................ 349/12
6,067,144 A * 5/2000 Murouchi .................... 349/156
6,069,675 A * 5/2000 Mizobata et al. .............. 349/12
6,204,897 B1 * 3/2001 Colgan et al. ................ 349/12

* cited by examiner

Primary Examiner—Toan Ton
Assistant Examiner—Andrew Schechter
(74) Attorney, Agent, or Firm—Scully, Scott, Murphy & Presser; Marian Underweiser, Esq.

(57) ABSTRACT

The present invention provides a newly constituted liquid crystal display element incorporating a touch sensor unit.

In a liquid crystal display element where a liquid crystal layer is inserted between a first substrate and a second substrate, a display electrode for displaying an image and a touch electrode for detecting a touch position are provided on the surfaces of the first substrate and the second substrate opposing with each other. The display electrode may be used as the touch electrode. A pillar-shaped spacer may be formed to support the first substrate and the second substrate. Additionally, the touch electrode may be provided on a convex-shaped part formed on the substrate.

17 Claims, 9 Drawing Sheets

LIQUID CRYSTAL DISPLAY ELEMENT INTEGRATED WITH A TOUCH SENSOR

BACKGROUND OF THE INVENTION

1. Technical Field

The present invention relates to a liquid crystal display element integrated with a touch sensor, more particularly to a liquid crystal display element integrated with a touch sensor using a resistive membrane method.

2. Prior Art

Heretofore, it has been necessary to add a touch sensor unit as an external component to a liquid crystal display element when a touch panel function is given to the liquid crystal display element using, for example, a resistive membrane method.

Figure 1:
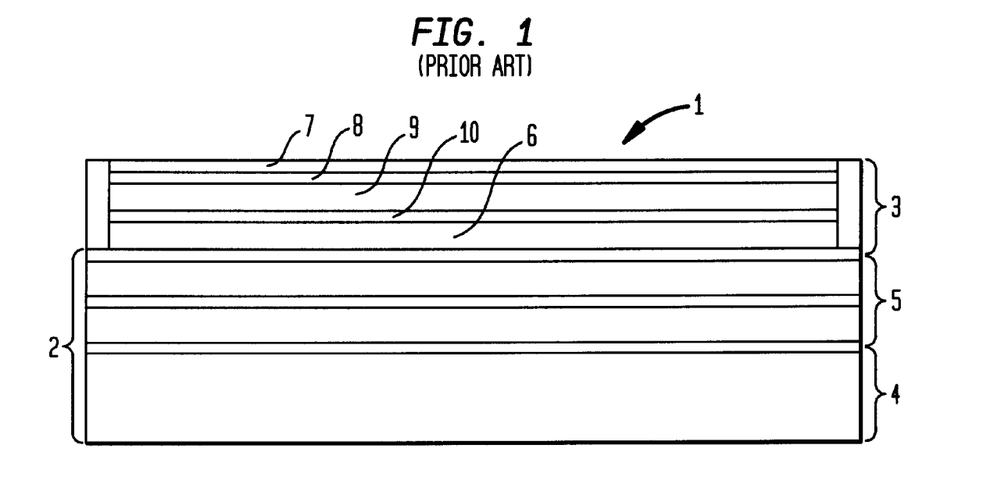
FIG. 1 is a cross-sectional view showing a liquid crystal display element having a touch sensor function of the prior art.

FIG. 1 shows a liquid crystal display apparatus 1 having a conventional touch sensor function. That is, an upper electrode 8 is formed on a film 7 and a lower electrode 10 is formed on a glass substrate 6. By laminating the film 7 and the glass substrate 6 via a spacer, a touch sensor unit 3 of the resistive membrane method is formed. There is a space 9 between the upper electrode 8 and the lower electrode 10. Then, this touch sensor unit 3 is attached externally to a liquid crystal display element 2 composed of a back light 4 and a TFT array cell 5.

However, as described above, attaching a touch sensor unit externally means adding the touch sensor unit as an extra component to the foregoing liquid crystal display element. This has resulted in thickening and weighting of the whole of the element. Additionally, this has resulted in creating an optically undesirable condition owing to degradation of performance such as transmissivity. For this reason, it has been difficult for an electronic apparatus required to be compact and light weight such as a note book type personal computer to be equipped with a touch sensor unit. Moreover, since a touch sensor unit of this kind is fabricated in a different process from that for a liquid crystal element, its cost has also increased.

Figure 2:
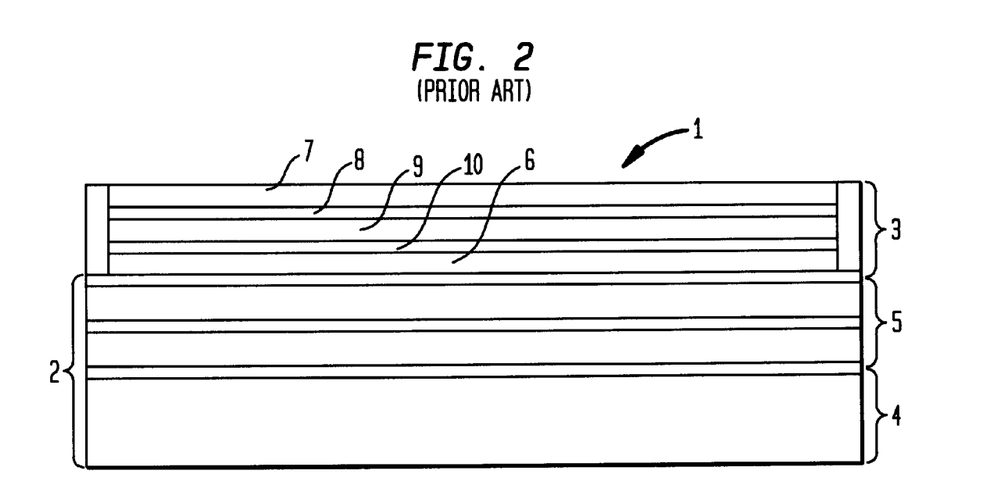
FIG. 2 is a cross-sectional view showing a liquid crystal display element having a touch sensor function of the prior art.

To solve this problem, as shown in FIG. 2, substituting a film 11 for the glass substrate 6 composing the touch sensor unit 3 has been investigated. This has improved the problem of thickness and weight to some extent, but it is unsatisfactory. Moreover, using a film has caused increase of cost conversely because of complexity of a fabricating process of a conductive thin film, as compared with a fabricating process of a glass substrate. And lack of strength and optical non-uniformity of a film has made it impossible to fabricate a touch sensor unit exhibiting full reliability and optical characteristics.

It is an object of the present invention to provide a compact and light weight liquid crystal display element incorporating a touch sensor unit. It is another object of the present invention to provide a liquid crystal display element incorporating a touch sensor unit exhibiting excellent position detectability by a touch operation.

SUMMARY OF THE INVENTION

A liquid crystal display element integrated with a touch sensor of the present invention comprises a first substrate, a second substrate opposing the first substrate, a liquid crystal layer interposed between the first substrate and the second substrate, a display electrode and a touch electrode disposed on the surface adjacent to the liquid crystal layer of at least either the first substrate or the second substrate. And a liquid crystal display element integrated with a touch sensor of the present invention has a pillar-shaped spacer, and has a convex-shaped part on which the touch electrode is provided.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENTS OF THE INVENTION

Figure 3:
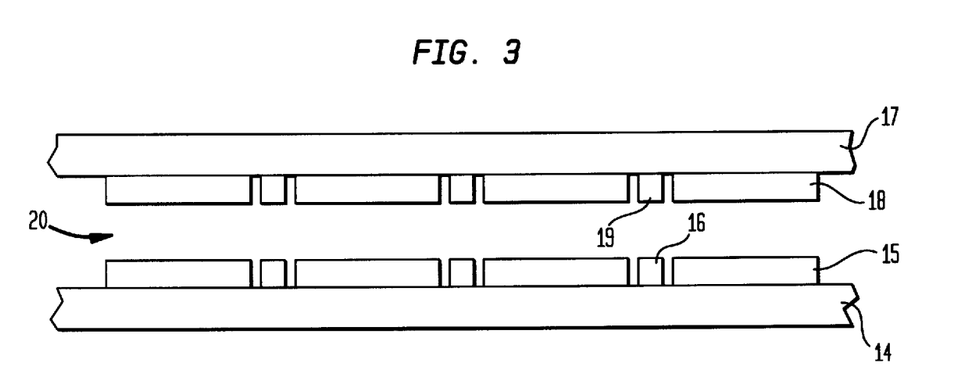
FIG. 3 is a cross-sectional view partially showing an example of a liquid crystal display element integrated with a touch sensor of the present invention.

FIG. 3 is a cross-sectional view showing an example of a liquid crystal display element integrated with a touch sensor of the present invention. A first display electrode 15 and a first touch electrode 16 are provided on a first substrate 14, and a second display electrode 18 and a second touch 19 electrode are provide on a second substrate 17. A liquid crystal layer 20 is interposed between the first substrate 14 and the second substrate 17. The present invention can be applied to a liquid crystal display apparatus of both a reflective type and a transparent type.

Figure 4:
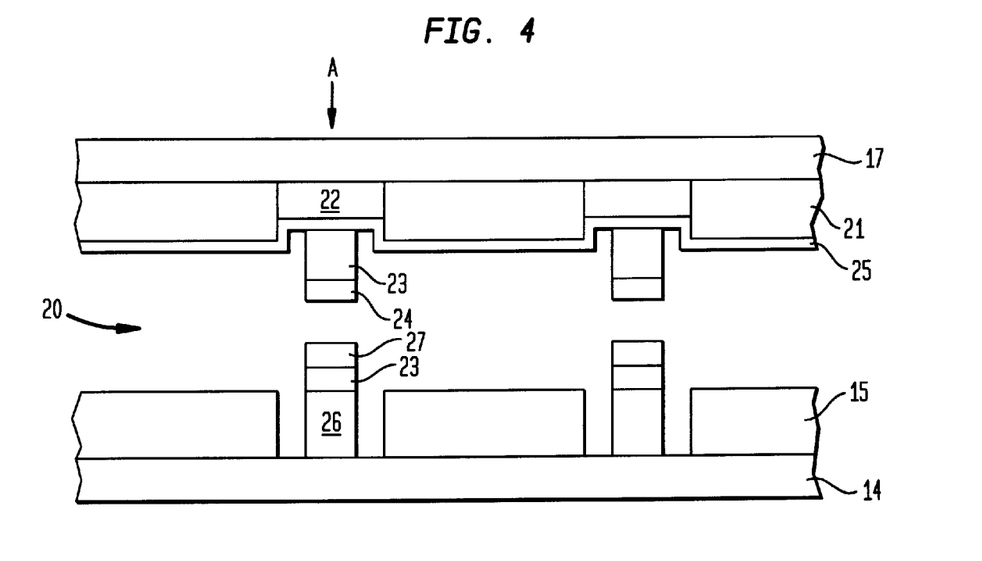
FIG. 4 is a cross-sectional view showing an example of a liquid crystal display element integrated with a touch sensor of the present invention.

FIG. 4 is a cross-sectional view showing another example of a liquid crystal display element integrated with a touch sensor of the present invention. The first display electrode 15 is formed on the first substrate 14. In FIG. 4, the first display electrode 15 is indicated as a pixel electrode. A color filter layer 21 and a black matrix layer 22 are provided on the second substrate 17, and the second display electrode 25 is formed thereon.

In FIG. 4, the second display electrode 25 is indicated as a common electrode.

Additionally, on the first substrate 14, a pixel electrode drive wiring 26, an insulating layer 23 and a first touch electrode 27 are formed on the area where the first display electrode 15 is not formed. The pixel electrode drive wiring 26 is a gate line or a data line. On the second substrate 17, the insulating layer 23 and a second touch electrode 24 are provided on the second display electrode 25 on the area where the black matrix layer 22 exists.

In FIG. 4, applying a voltage between the pixel electrode (the first display electrode 15) and the common electrode (the second display electrode 25) causes alignment change in liquid crystal molecules included in the liquid crystal layer 20. This alignment change enables control of light transmissivity, whereby an image can be displayed. On the other hand, for example, by depressing the second substrate 17 with a finger, contact between the first touch electrode 27 and the second touch electrode 24 enables detection of a touch point.

Figure 5:
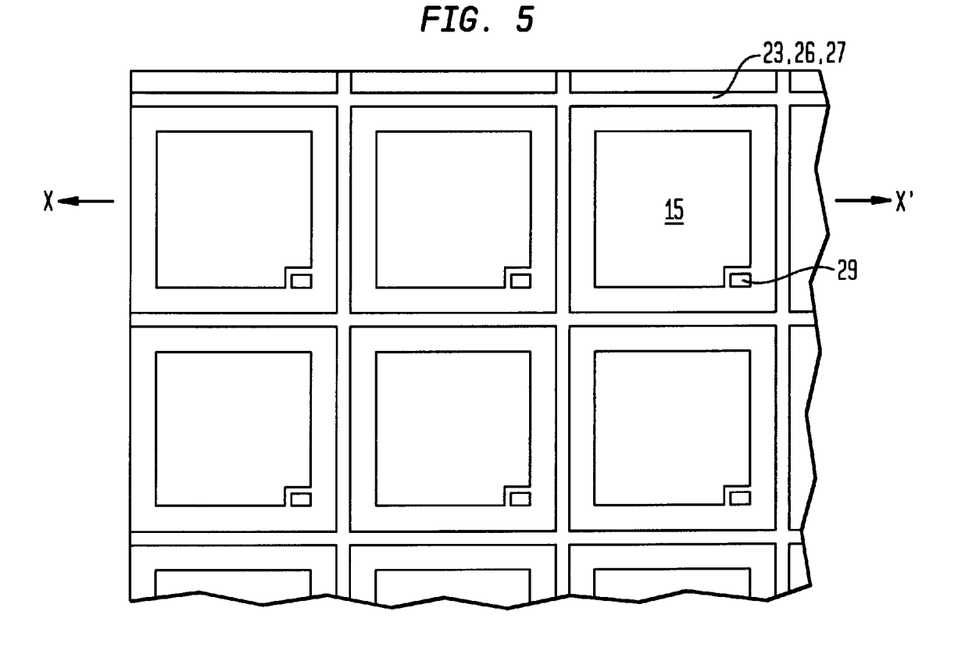
FIG. 5 is a plan view showing an example of a liquid crystal display element integrated with a touch sensor of the present invention.

FIG. 5 is a plan view of the first substrate 14 of FIG. 4 as viewed from the direction of an arrow A. The first display electrode 15 and a thin film transistor 29 are formed on the surface adjacent to the liquid crystal layer 20 of the first substrate 14. Additionally, the pixel electrode drive wiring 26, the insulating film 23 and the first touch electrode 27 are provided in a laminated manner in the area where the first display electrode 15 and the thin film transistor 29 are not formed. In FIG. 5, for simplicity, connection between the pixel electrode drive wiring 26 and the thin film transistor 29 is omitted. A cross-sectional view in X-X' line of FIG. 5 corresponds to FIG. 4.

Figure 6:
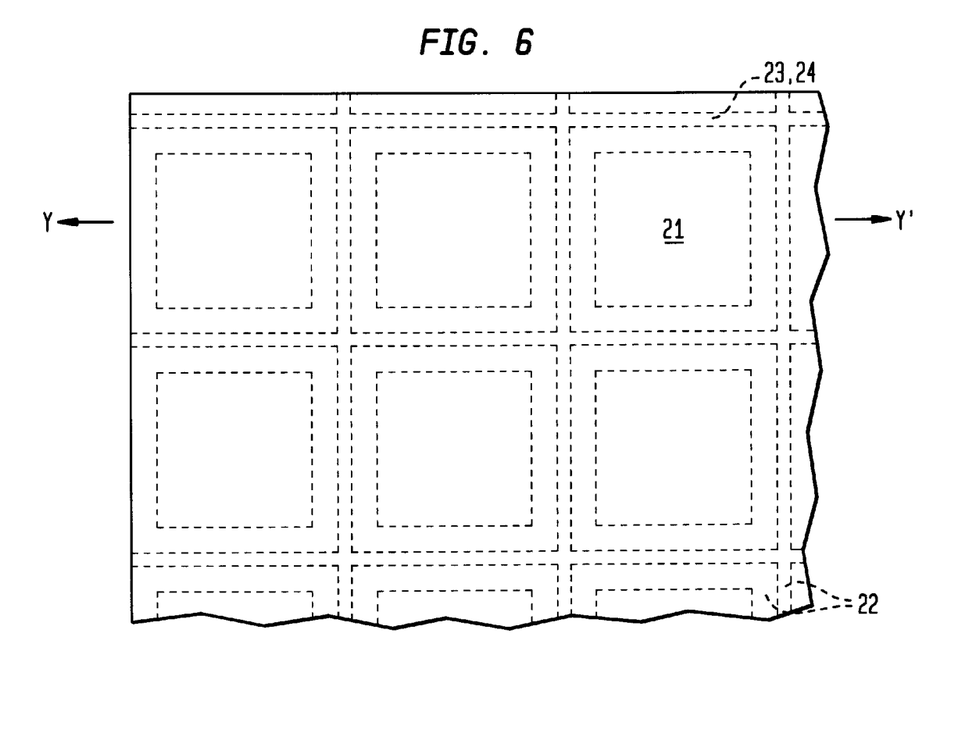
FIG. 6 is a plan view showing an example of a liquid crystal display element integrated with a touch sensor of the present invention.

FIG. 6 is a plan view of the second substrate 17 of FIG. 4 as viewed from the direction of an arrow A, showing a configuration of a back surface of the second substrate 17 by a dotted line. A color filter layer 21 is formed on the surface adjacent to the liquid crystal layer 20 of the second substrate 17. Additionally, a black matrix 22 is formed on an area other than the area where the color filter layer 21 is formed. The common electrode (the second display electrode 25) is formed entirely on the color filter layer 21 and the black matrix layer 22 though this is not shown in FIG. 6. The insulating film 23 and the first touch electrode 24 are formed in a laminated manner in the area where the black matrix is formed. FIG. 4 corresponds to a cross-sectional view in Y-Y' line of FIG. 6.

So far, the first and the second touch electrodes are explained as a resistor wiring which is formed vertically and horizontally in mesh-like configuration. The touch electrode may be so configured that a position is detected by contact between an upper region and a lower region in resistor wiring, additionally, that its contact is established via only a protrusion which is formed in a crossing point of the resistor wiring. Moreover, the protrusion of the crossing point and a wiring between crossing points may be composed of the same resistor material. Alternatively, the protrusion of the crossing point may be composed of metal with a high conductivity and the wiring between the crossing points may be composed of a resistor material.

Figure 7:
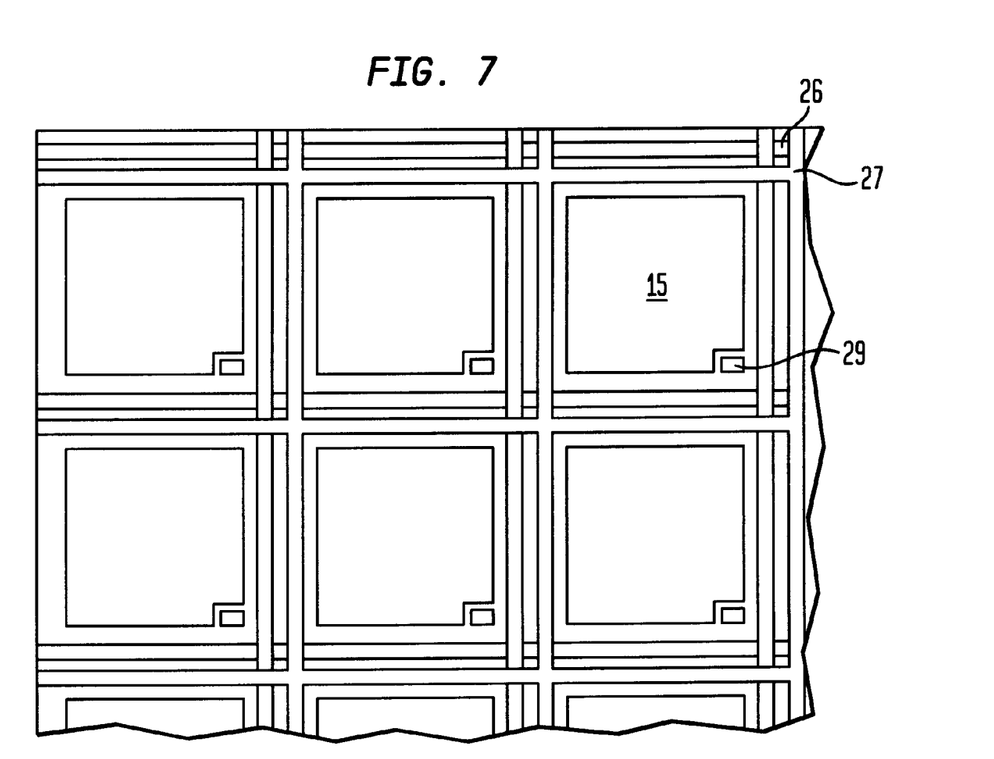
FIG. 7 is a plan view showing an example of a liquid crystal display element integrated with a touch sensor of the present invention.

FIG. 7 is a modified example of FIG. 6. In FIG. 6, the pixel electrode drive wiring 26 and the first touch electrode 27 are laminated via the insulating layer 23. However, it is only necessary that the pixel electrode drive wiring 26 and the first touch electrode 27 are electrically insulated. Accordingly, as shown in FIG. 7, the pixel electrode drive wiring 26 and the first touch electrode 27 may be configured as a parallel wiring to be arranged apart a little from each other.

Figure 8:
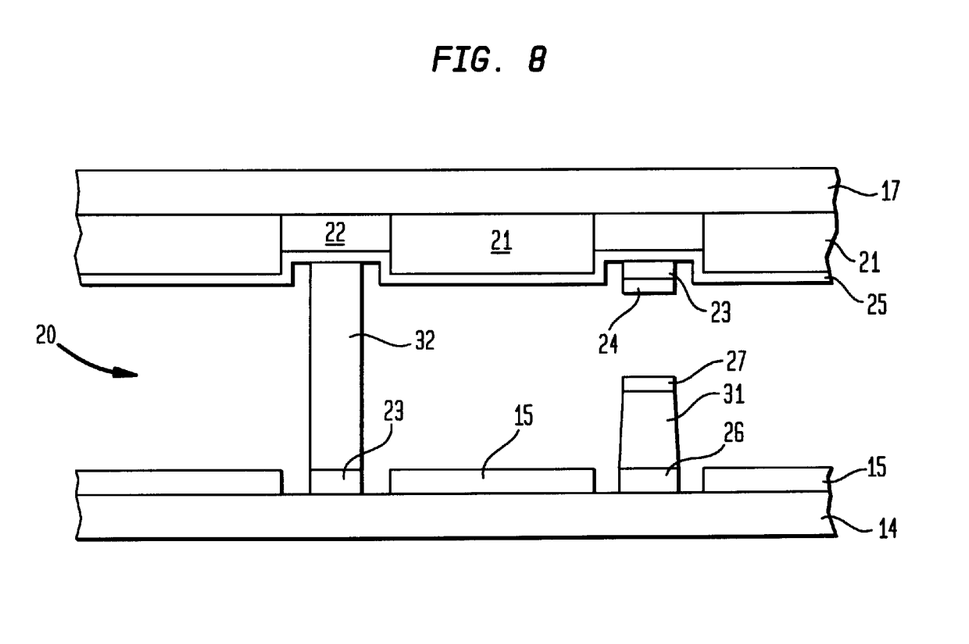
FIG. 8 is a cross-sectional view partially showing an example of a liquid crystal display element integrated with a touch sensor of the present invention.

FIG. 8 schematically shows another embodiment of the present invention. In the same manner as FIG. 4, the pixel electrode 15 and the pixel electrode drive wiring 26 are formed on the first substrate 14. The color filter layer 21, the black matrix layer 22 and the second display electrode 25 are formed on the second substrate 17. In FIG. 8, a pillar-shaped spacer 32 is formed to make a distance between the first substrate and the second substrate uniform and keep the thickness of the liquid crystal layer 20 constant. The liquid crystal display element of the present invention has a touch sensor function. Accordingly, in use of this touch sensor function, a surface of the substrate is pushed by a finger or a pen to be deformed. One of widely used spacer materials in a liquid crystal display element is a spherical type. However, spherical spacers are not desirable because some spacers can not regain to the original position, once being moved by a pushing pressure caused by a touch operation, or other spacers, when being moved, injure an alignment film layer and the like which are formed on the display electrode or on the surface of the display electrode when the spherical spacers are used for the liquid crystal display element including a touch sensor. A pillar-shaped spacer 32 shown in the present invention solves the above-mentioned problems and makes it possible to obtain a liquid crystal display element which is durable to a large number of touch operations.

Additionally, in the present invention, a touch electrode may be disposed on a convex-shaped part. In FIG. 8, a convex-shaped part 31 is formed on the pixel electrode drive wiring 26, and the first touch electrode 27 is formed thereon. The pixel electrode drive wiring 26 and the convex-shaped part 31 may be formed so as not to overlap or to partially overlap with each other. Additionally, the convex-shaped part 31 may be formed on the surface of the second substrate 17 or on both surfaces of the first substrate 14 and the second substrate 17. In either case, a distance between the first touch electrode 27 and the second touch electrode 24 can be narrowed as compared with the case where the convex-shaped part is not in use. As shown in FIG. 8, as a height of the convex-shaped part 31 is smaller than that of the pillar-shaped spacer 32, a gap having a much thinner thickness than that of the liquid crystal layer is formed between the first touch electrode 27 and the second touch electrode 24. Accordingly, since forming the convex-shaped part 31 enables detection of a touch point by light depression of a substrate surface, a liquid crystal display element incorporating a touch sensor unit exhibiting excellent position detectability by a touch operation can be obtained.

As both the pillar-shaped spacer 32 and the convex-shaped part 31 are formed, position detectability can be extremely enhanced. Forming only the convex-shaped part 31 possibly leads to detection with even a careless touch of a finger because the first touch electrode 27 and the second touch electrode 24 are very close. Using the convex-shaped part 31 together with the pillar-shaped spacer 32 can, according to necessity, makes a threshold value of deformation quantity of the second substrate 17 heightened in determining whether there is a touch operation or not. Also, this usage can prevent performance of the liquid crystal display element from degrading because the second substrate 17 itself is not greatly deformed.

From the viewpoint of design, it is considered as advantageous that the convex-shaped part 31 is made of an insulating material, because the second touch electrode 27 should be insulated from the pixel electrode drive wiring 26, in such a case that the convex-shaped part 31 is disposed on the pixel electrode drive wiring 26 as shown in FIG. 8.

However, when there is a substitution for solving this insulating problem, or when there is no need for insulating, a material for the convex-shaped part 31 is not necessarily limited to an insulating material. Accordingly, the convex-shaped part 31 may be made of the same material as that of the touch electrode, or the same material as that of the pillar-shaped spacer, or a material different from that of the touch electrode or the pillar-shaped spacer.

Figure 9:
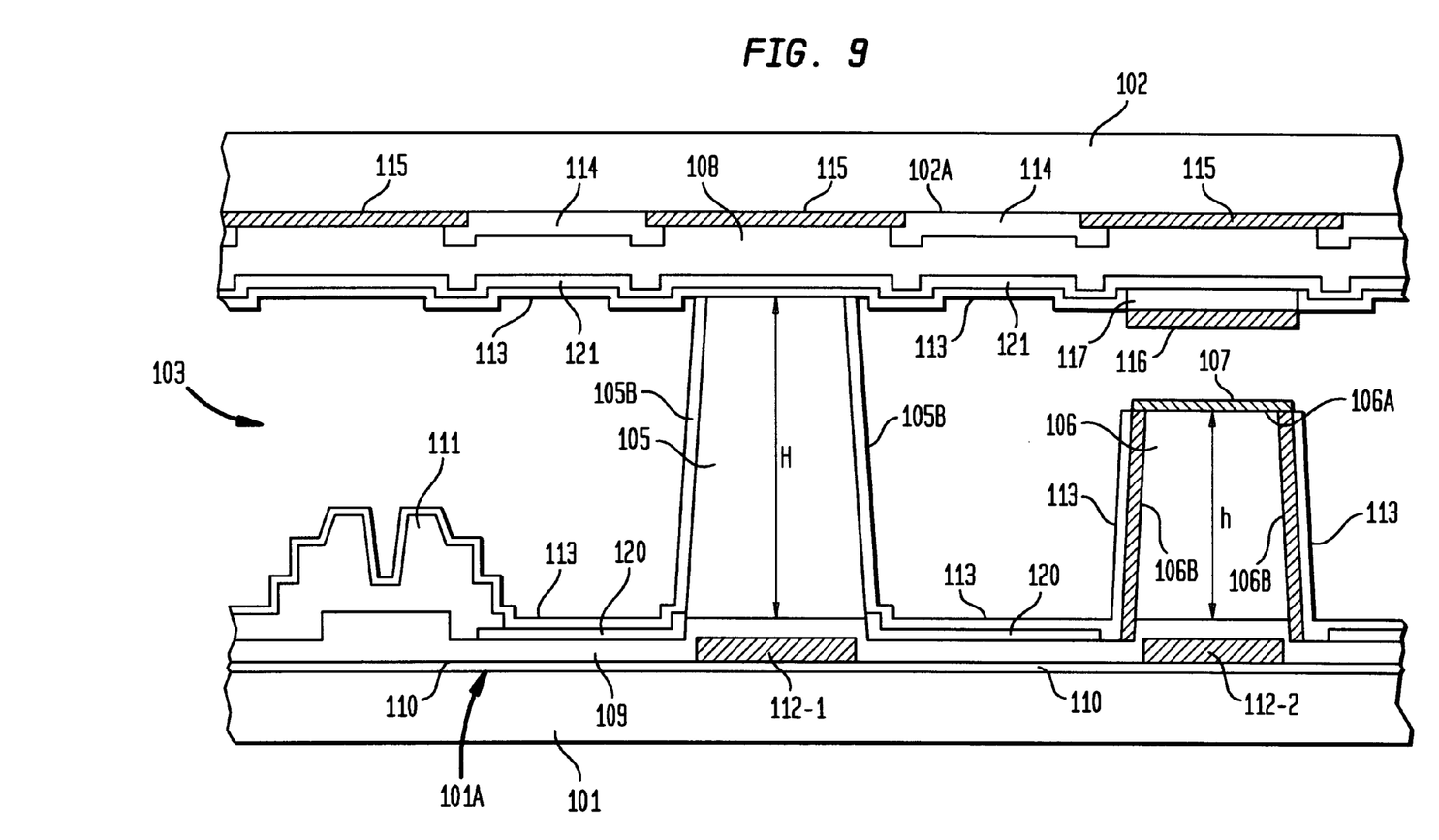
FIG. 9 is a cross-sectional view partially showing an example of a liquid crystal display element integrated with a touch sensor of the present invention.

FIG. 9 shows more concrete configuration of the present invention. It may be thought that a thin film transistor, a pillar-shaped spacer and a convex-shaped part, which are schematically depicted in a cross-sectional diagram for easy understanding, are in linear relationship, but they are not necessarily disposed in linear relationship. An undercoat layer 110 is formed on a main surface 101A of a first substrate 101, and a gate insulating film 109 is formed thereon. Then, a pixel electrode 120 for applying a voltage on a liquid crystal layer 103 is formed on the gate insulating layer 109. And, a wiring for a gate electrode, so-called gate line 112-1 and 112-2 are formed in the gate insulating film 109. Then, the pillar-shaped spacer 105 composed of an insulating material is formed on the gate line 112-1, and sustains the first substrate 101 and the second substrate 102. On the other hand, the convex-shaped part 106 with smaller height than that of the pillar-shaped spacer 105 is formed on the gate line 112-2. The first touch electrode 107 composed of a conductive material is formed on an upper surface 106A and a side surface 106B of the convex-shaped part 106, that is, the surface of the convex-shaped part 106.

In a main surface 102A of the second substrate 102, the black matrix 115 is formed at the position opposite to the gate line 112-1, 112-2 and the thin film transistor 111. Additionally, the color filter 114 is formed at the position where it is not opposite to the foregoing gate line and adjacent to the black matrix 115. Then, the common electrode 121 is formed thereon via a protecting film 108. And, the second touch electrode 116 composed of conductive material, via the insulating film 117, is formed at the position opposite to the first touch electrode 107 on this common electrode 121.

Additionally, for the purpose of aligning liquid crystal, a polyimide film 113 is formed on the main surface 101A of the first substrate 101 so that the thin film transistor 111 and the pixel electrode 120 can be covered. In the same manner, on the second substrate 102, the polyimide layer 113 is formed on the common electrode 121 except for the area where the second touch electrode 116 is formed. Additionally, the polyimide film 113 is also formed on a side surface 105B of the pillar-shaped spacer 105 and a side surface 106B of the convex-shaped part.

In a liquid crystal display element integrated with a touch sensor of the present invention, when a touch sensor input part of the liquid crystal display screen is not depressed, the configuration shown in FIG. 9 is retained by the pillar-shaped spacer 105 without any deformation to an element itself. Accordingly, the first touch electrode 107 is not electrically in contact with the second touch electrode 116. Consequently, a position information is not updated because no current flows through a resistor circuit not shown. On the other hand, when the touch sensor input part of the liquid crystal display screen is depressed, the second substrate 102 is curved toward the first substrate 101. As a result, the first touch electrode 107 is electrically in contact with the second touch electrode 116, and current flows through the resistor circuit not shown connected to these electrodes. The foregoing resistor circuit is formed over the whole of a liquid crystal display element including the first substrate 101 and the second substrate 102. A current detecting means is respectively provided, for example, at four corners of the liquid crystal display element. A resistance value between a touch position and a current detecting means differs according to a touch position, whereby a current value detected at each corner differs. By reading the foregoing current value in the touch sensor circuit, position information can be updated.

As such, a liquid crystal display element integrated with a touch sensor of the present invention incorporates a touch sensor unit in it. Accordingly, as compared with the case where the touch sensor unit is attached externally to the liquid crystal display element, thickness and weight of the element itself can be lessened and cost can be decreased. Moreover, avoiding usage of a surplus film and a glass substrate makes it possible to obtain an element exhibiting excellent optical characteristics.

In a liquid crystal display element integrated with a touch sensor shown in FIG. 9, using the thin film transistor 111 which is a nonlinear active element, the liquid crystal layer 103 is driven in an active matrix method. However, a liquid crystal display element integrated with a touch sensor of the present invention may be driven by other methods, such as a direct drive method or a beam address method. It should be noted that the active matrix method makes it possible to obtain a liquid crystal display element integrated with a touch sensor with high image quality, a high pixel density and a large capacity because of separation of a display signal input terminal from an address signal input terminal.

Additionally, in a liquid crystal display element integrated with a touch sensor shown in FIG. 9, forming the color filter 114 on the main surface 102A of the second substrate 102 enables a color display. However, instead of using a color filter, injecting a dichroism pigment into the liquid crystal layer 103 also enables a color display. However, using a color filter makes it possible to obtain a liquid crystal display element integrated with a touch sensor with a high resolution.

In FIG. 9, the pillar-shaped spacer 105 is formed on the gate line 112-1. However, a position where the pillar-shaped spacer 105 is formed does not need to be limited, as far as the pillar-shaped spacer 105 may be formed between the first substrate 101 and the second substrate 102, which make a pair, may sustain these substrates. However, forming the pillar-shaped spacer in the position where the thin film transistor 111 and the color filter 114 exist makes it impossible for the thin film transistor 111 and the color filter 114 to function fully. Accordingly, it is preferable that the pillar-shaped spacer is formed in the position where the thin film transistor 111 and the color filter 114 do not exist.

In the internal configuration of a liquid crystal display element, the pixel electrode drive wiring, that is, the portion where the gate line and the data line are formed possesses a relatively large space. And, generally, the color filter is formed in the area where the pixel drive wiring does not exist. Additionally, as shown in FIG. 9, since the gate line is formed inside the gate insulating film 109, forming some other member on the gate line causes no influence on the characteristics of the gate line itself. Accordingly, as shown in FIG. 9, it is preferable that the pillar-shaped spacer is formed on the pixel drive wiring. The pixel drive wiring is arranged uniformly, vertically and horizontally inside a liquid crystal display element, thus presenting mesh configuration. Consequently, forming the pillar-shaped spacer on the pixel drive wiring also enables a uniform arrangement of the pillar-shaped spacer on the whole of the element.

As for the position where the convex-shaped part is formed, in the same way as the pillar-shaped spacer, it is preferable that the convex-shaped part is formed in the portion where the thin film transistor 111 and the color filter 114 do not exist. Additionally, as shown in FIG. 9, the convex-shaped part is preferably formed on the pixel drive wiring 112-2. This brings the same effect as that in the case of the pillar-shaped spacer.

The pillar-shaped spacer 105 can be configured into a variety of shapes, such as a cylindrical shape, a square pole shape. The convex-shaped part 106 can be also configured into a variety of shapes, such as a square pole shape and a cylindrical shape having a trapezoidal cross-section as shown in FIG. 9. And, the number of the pillar-shaped spacer 105 and the convex-shaped part 106 is determined by the size of the liquid crystal display screen, the number of pixels on the liquid crystal display screen and the accuracy of position information to be required. However, it is preferable that the pillar-shaped spacer 105 is uniformly formed and equally spaced between the first substrate 101 and the second substrate 102 for sustaining these substrates.

The width of the pillar-shaped spacer 105 is determined according to the width of the gate line 112-1, when the pillar-shaped spacer 105 is formed on the gate line 112-1 as shown in FIG. 9. On the other hand, the height H of the pillar-shaped spacer 105 preferably ranges 3 to 7 $\mu$m, more preferably 4 to 6 $\mu$m.

The width of the convex-shaped part 106 is also determined according to the width of the gate line 112-2, when the convex-shaped part 106 is formed on the gate line 112-2 as shown in FIG. 9. On the other hand, it is preferable that the height H is such an extent that the second touch electrode 116 contacts the upper surface 106A of the convex-shaped part 106, with a tip of a pen being lightly touching on the liquid crystal display screen. Specifically, the height of the convex-shaped part is preferably smaller by 0.5 to 6.5 $\mu$m, more preferably smaller by 1 to 4 $\mu$m than the height H of the pillar-shaped spacer 105.

Any method can be employed for forming the pillar-shaped spacer 105 and the convex-shaped part 106. However, the method using both photo resist and etching together is available. That is, the method comprises the step of coating a resist material, the step of performing plural number of masking processes and the step of performing some number of exposing and developing process. At this time, the number of exposing and developing process differs between the portion where the pillar-shaped spacer is to be formed and the portion where the convex-shaped part is to be formed. When the convex-shaped part is formed using this method, the whole of the member becomes an insulator. In order to prevent this, the first touch electrode 107 composed of a conductive material is formed on the surface of the convex-shaped part 106 by performing another masking.

And, unlike the example shown in FIG. 9, the common electrode 121, which is formed on the surface of the second substrate 102, may be used as the second touch electrode, without disposing the second touch electrode 116 and the insulating film 117. In this case, the resistor circuit is disposed only on the surface of the first substrate 101 and connected with the first touch electrode 107. Then, measuring a current flowing through the foregoing resistor circuit at four corners thereof enables determination whether the contact operation occurs or not and of the position where it occurs. A voltage of the common electrode 121 keeps the same value everywhere in specific timing. Thus, detection of a touch position becomes easy using the resistor circuit connected with the first touch electrode. Alternatively, detection of a touch position may be possible by detecting contact between the second touch electrode and the pixel electrode using the resistor circuit connected with the second touch electrode without disposing the first touch electrode. In this case, since a voltage of the pixel electrode possibly differs according to each pixel, in detection of the touch position, a voltage of the pixel electrode in contact with the resistor circuit needs to be taken into account. When the common electrode is used as the second touch electrode or when the pixel electrode is used as the first touch electrode, a disadvantage possibly occurs that an image disturbance in the vicinity of the touch point in touching. However, a disturbance of an image in the vicinity of the touch point is in reality not always critical because a pen and a finger are obstacles for viewing an image and it is difficult to observe the vicinity of the touch point in touching.

Figure 10:
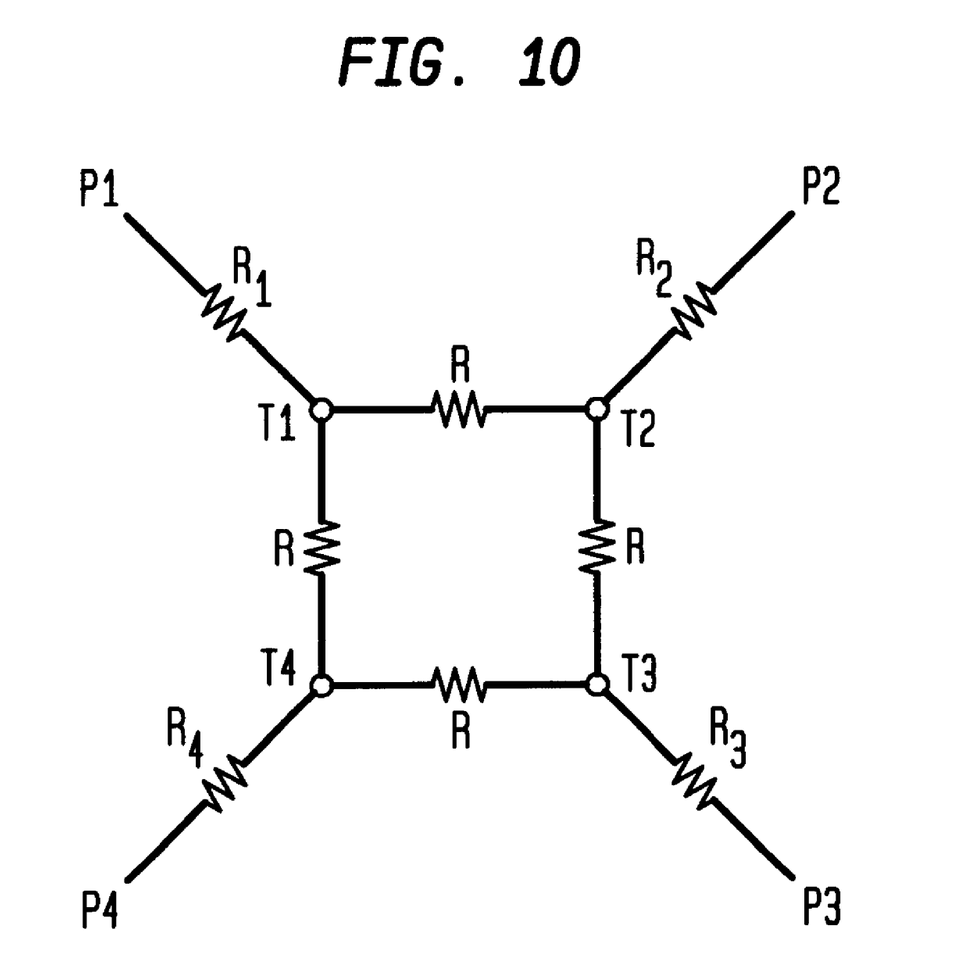
FIG. 10 is a view illustrating position detection method of the present invention.

The principle of position detection will be described with reference to FIG. 10. In the first substrate, touch electrodes T1 to T4 composed of 2F2 matrix as a model are formed and current is detected at positions P1 to P4. For simplicity, resistance of every resistor line is R and a voltage V is applied to it. In the second substrate, a common electrode which is used as the second display electrode and the touch electrode is formed and grounded. If T2 is in contact with the common electrode, resistances R1 to R4 between T2 and positions P1 to P4 are respectively R1=7R/4, R2=R, R3=7R/4, R4=2R. Currents I1 to I4 are detected at positions P1[?]P4 with by applying a voltage V to this resistor. The method of determining position coordinates from the current detected in this way is known as 5 wire method. In 5 wire method, coordinates of a touch position are determined by equations shown below:

$X=(W/2)\{(I2+I3)-(I1+I4)\}/(I1+I2+I3+I4)$ $Y=(W/2)\{(I1+I2)-(I3+I4)\}/(I1+I2+I3+I4)$

On the basis of this equation, when T2 is in contact with the common electrode, X=6/59, Y=6/59. In the same way, when T1 is in contact with the common electrode, X=−6/59, Y=6/59. It can be determined which point among four points is in contact with. When the number of the touch electrode is increased, basic calculation process is the same. As described above, even when the common electrode is used as the touch electrode, position coordinates can be determined. Since it is the matter of a voltage difference between contact points of upper portions and a lower portions eventually, detection of the voltage difference between the contact points enables detection of a contact position. Accordingly, it can be understood that detection of a touch position is in principle possible even when the pixel electrode is used as the touch electrode, or even when a reverse driving is performed to prevent molecule from being degraded.

In a liquid crystal display apparatus possessing no touch function, a voltage on the common electrode, which should be constant, in reality fluctuates owing to an effect of an ON-OFF operation to the pixel electrode. When the common electrode is used as the touch electrode as in the present invention, there is a problem that a detecting accuracy of a touch position degrades by an influence of such a voltage fluctuation. Increasing a voltage applied to the touch electrode for solving this problem possibly causes a bad influence on image quality over a wide range including an area in contact while touching and the vicinity while a position accuracy is increased. To suppress a voltage applied to the touch electrode to such a low level that it does not influence image quality, a fluctuation of the electrode voltage may be detected when the touch electrode is in contact with the common electrode. Then, touch position coordinates may be calculated taking its fluctuation into account.

Figure 11:
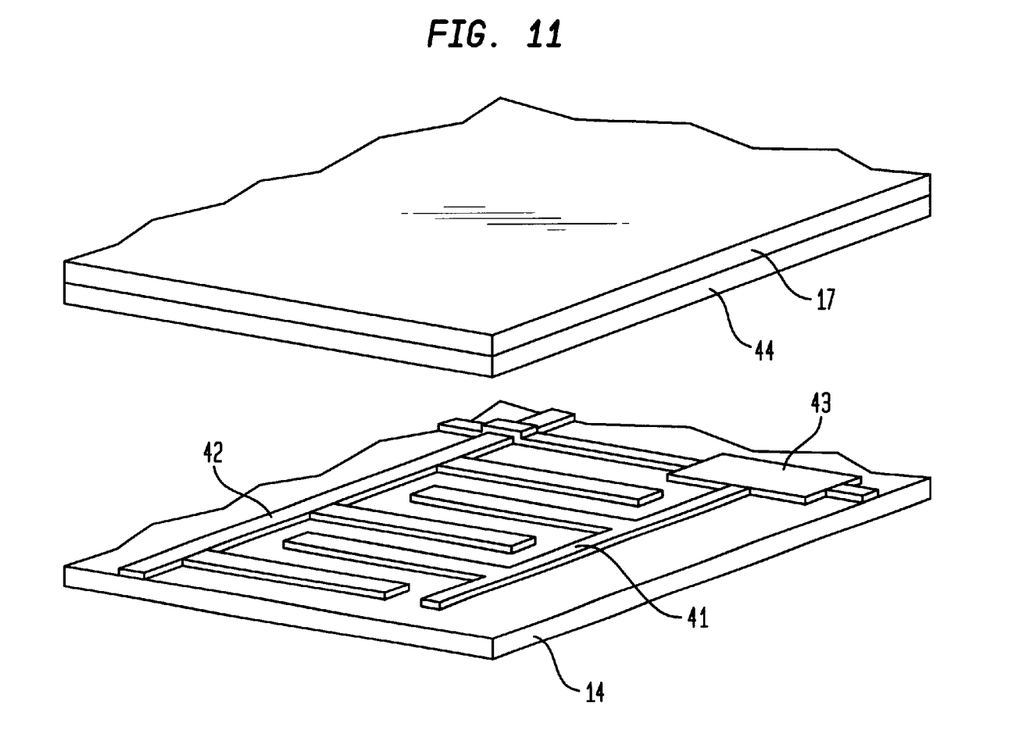
FIG. 11 is a perspective view schematically showing an example of a liquid crystal display element integrated with a touch sensor of the present invention.

In an example described above, the first display electrode is disposed on the first substrate, and the second display electrode is provided on the second substrate. This example typically corresponds to a twisted nematic liquid crystal mode. However, in another example of the present invention, both the first display electrode and the second display electrode may be disposed on the first substrate. This example corresponds to an in-plane switching mode. FIG. 11 schematically shows a perspective view illustrating one pixel in the liquid crystal display element where the common electrode is used as the first touch electrode in an in-plane switching mode. The pixel electrode 41 that is the first display electrode and the common electrode 42 that is the second pixel electrode are formed on the first substrate 14. In brief, the common electrode 42 is grounded and the thin film transistor 41 is allowed to be in an ON-state or an OFF-state, thus controlling a voltage applied to the pixel electrode 41, whereby alignment of liquid crystal changes and an image can be displayed. The touch electrode 44 is formed on the second substrate 17 and a constant voltage for detecting a touch position is applied to it. FIG. 11 is a view showing that the touch electrode is formed on the whole of the second touch electrode. However, the touch electrode may be vertically and horizontally formed in a mesh state in the same way as the second touch electrode 24 in FIG. 6. Alternatively, the touch electrode may be formed in the position where it overlaps the common electrode 42 of the first substrate. In FIG. 11, by being depressed with a finger from the surface of the second substrate 17, the common electrode 42 and the touch electrode 44 are in contact with each other. Then, a voltage difference between the grounded common electrode 42 and the touch electrode 44 to which a constant voltage is applied creates a current flow, whereby a touch position is detected.

Although the present invention has been described in detail with reference to the preferred embodiment, showing concrete examples, the present invention in not to be limited to the particular embodiments. And the present invention encompasses any modifications or alternative embodiments that fall within the scope of the claims.

As described above, a liquid crystal display element integrated with a touch sensor incorporates a touch sensor means in it. Accordingly, as compared with the case where the touch sensor unit is attached externally to the liquid crystal display element, thickness and weight of the element itself can be lessened and cost can be decreased. Consequently, a touch sensor function can be given to an electronic apparatus such as a note book type personal computer required to be compact and light weight and to have a relatively large display screen. Additionally, possessing a pillar-shaped spacer and a convex-shaped part improves touch performance and durability.

While the present invention has been particularly shown and described with respect ot preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A liquid crystal display element integrated with a touch sensor comprising:
   a first substrate and a second substrate opposing said first substrate;
   a liquid crystal layer interposed between said first substrate and said second substrate;
   a display electrode for an image display disposed on the surface adjacent to said liquid crystal layer of at least either the first substrate or the second substrate; and
   a touch electrode comprising a first touch electrode disposed on said first substrate and a second touch electrode disposed on said second substrate, whereby detection of a touch point relative to said first substrate or said second substrate by contact of said first touch electrode and said second touch electrode is enabled.

2. A liquid crystal display element integrated with a touch sensor according to claim 1,
   wherein said touch electrode is formed on said display electrode via an insulating layer.

3. A liquid crystal display element integrated with a touch sensor according to claim 1,
   wherein said display electrode is formed in a pattern and said touch electrode is formed in the area where said display electrode is not formed.

4. A liquid crystal display element integrated with a touch sensor according to claim 3,
   wherein a liquid crystal display element integrated with a touch sensor further includes a thin film transistor and a pixel electrode drive wiring disposed on said first substrate, and said display electrode is composed of a first display electrode disposed on said first substrate and a second display electrode disposed on said second substrate, and said first display electrode is a pixel electrode and said second display electrode is a common electrode.

5. A liquid crystal display element integrated with a touch sensor according to claim 4,
   wherein said first touch electrode is formed on said pixel electrode drive wiring via an insulating layer.

6. A liquid crystal display element integrated with a touch sensor according to claim 4,
   wherein at least either said pixel electrode and said common electrode is a transparent conductive film.

7. A liquid crystal display element integrated with a touch sensor according to claim 1,
   wherein said touch electrode is disposed on the surface adjacent to said liquid crystal layer on said first substrate, and said display electrode is disposed on the surface adjacent to said liquid crystal layer on said second substrate, and a touch point relative to said first substrate or said second substrate is detected by contact of said touch electrode and said display electrode.

8. A liquid crystal display element integrated with a touch sensor comprising:
   a first substrate and a second substrate opposing said first substrate;
   a liquid crystal layer interposed between said first substrate and said second substrate;
   a display electrode disposed on the surface adjacent to said liquid crystal layer of at least either said first substrate or said second substrate;
   a convex-shaped part disposed on the surface adjacent to said liquid crystal layer of at least either said first substrate or said second substrate; and
   a touch electrode for detecting a touch position disposed on said convex-shaped part.

9. A liquid crystal display element integrated with a touch sensor according to claim 8,
   wherein said liquid crystal display element integrated with a touch sensor further includes a pillar-shaped spacer for supporting said first substrate and said second substrate.

10. A liquid crystal display element integrated with a touch sensor according to claim 9, wherein a height of said pillar-shaped spacer is 3 $\mu$m to 7 $\mu$m.

11. A liquid crystal display element integrated with a touch sensor according to claim 9, wherein a height of said convex-shaped part is smaller by 1 $\mu$m to 4 $\mu$m than that of said pillar shaped spacer.

12. A liquid crystal display element integrated with a touch sensor according to claim 9, wherein at least either said pillar shaped spacer or said convex-shaped part is made of a resist material.

13. A liquid crystal display element integrated with a touch sensor according to claim 9, wherein said liquid crystal display element integrated with a touch sensor further includes a thin film transistor and a pixel electrode drive wiring formed on the first substrate and a color filter and a black matrix formed on the second substrate, and said thin film transistor and said pixel electrode drive wiring are disposed on the area where said black matrix is overlapped.

14. A liquid crystal display element integrated with a touch sensor according to claim 13, wherein said pillar-shaped spacer is formed on the area where said black matrix is substantially overlapped.

15. A liquid crystal display element integrated with a touch sensor according to claim 13, wherein said pillar-shaped spacer is formed on the area where said pixel electrode drive wiring is substantially overlapped.

16. A liquid crystal display element integrated with a touch sensor according to claim 13, wherein said convex-shaped part is formed on the area where said black matrix is substantially overlapped.

17. A liquid crystal display element integrated with a touch sensor according to claim 13, wherein said convex-shaped part is formed on the area where said pixel electrode drive wiring is substantially overlapped.

\* \* \* \* \*